United States Patent [19]

Gigantino et al.

[11] 3,747,892
[45] July 24, 1973

[54] MAGNETIC VALVE

[75] Inventors: Otto M. Gigantino, Newark; Victor Parrill, Hawthorne; Leonard D. Gigantino, Maplewood, all of N.J.

[73] Assignee: Wm. Steinen Mfg. Co., Parsippany, N.J.

[22] Filed: Jan. 27, 1972

[21] Appl. No.: 221,288

[52] U.S. Cl..................... 251/65, 251/366, 251/308
[51] Int. Cl............................................. F16k 31/08
[58] Field of Search..................... 251/65, 133, 134, 251/305, 308, 309, 366; 137/375

[56] References Cited
UNITED STATES PATENTS

| 3,347,262 | 10/1967 | Gibson............................... 137/375 |
| 2,364,700 | 12/1944 | Eplett.................................. 251/366 |
| 3,584,833 | 6/1971 | Grenier........................... 251/366 X |
| 3,042,357 | 7/1962 | Engholdt......................... 251/133 X |
| 3,176,720 | 4/1965 | Donahue......................... 251/133 X |

Primary Examiner—Henry T. Klinksiek
Attorney—Ostrolenk, Faber, Gerb & Soffen

[57] ABSTRACT

A magnetically driven valve structure having a driving sleeve magnet operated by a motor and a driven magnet co-axial with the driving magnet connected to a valve. The housing for the motor and the driving magnet is separable from the valve structure to permit soldering the valve structure into a fluid circuit without deleterious effect on the motor, motor controls and driving magnet. The basic valve structure is a forging having a platform supporting the housing. The housing is centered on the forging equidistant from the ends thereof. The driven magnet is housed in a hat-like non-magnetic cylindrical enclosure on the forging, the flanges of the hat being sealed to the forging by a rolled over lange of the forging and an O-ring gasket. The driving magnet is compliantly connected to the motor to permit the driving magnet to align itself properly on the outside of the hat-like enclosure and with the driven magnet. The valve is a Teflon coated gate valve which is longitudinally compliantly mounted with respect to the driven magnet to permit the valve to seat properly without restraint. The valve is gasketed in its seat by an O-ring held by the valve which may ride vertically, with the valve, in an annular bore in the valve seat.

6 Claims, 14 Drawing Figures

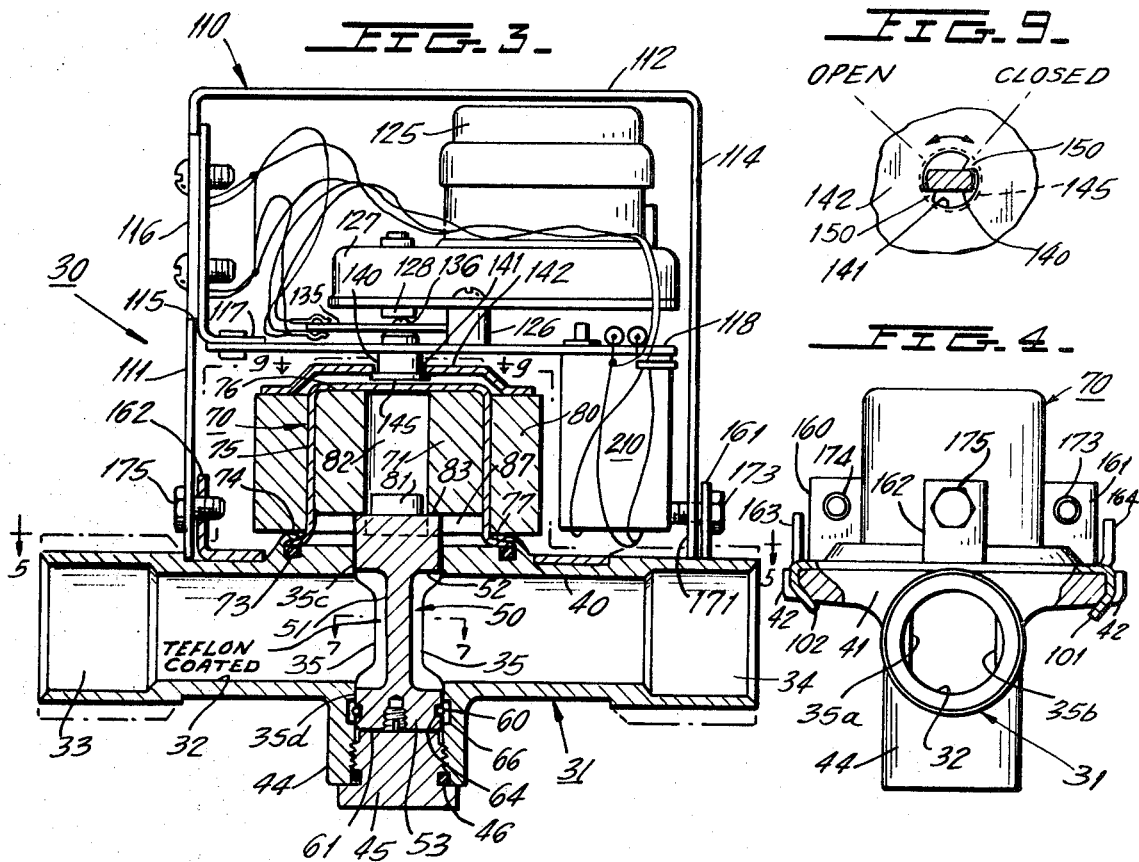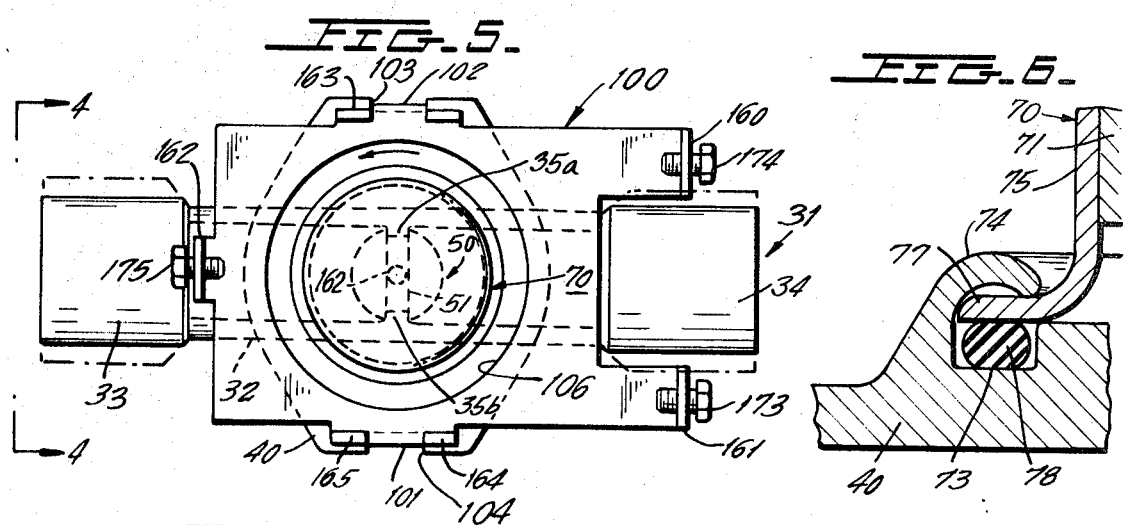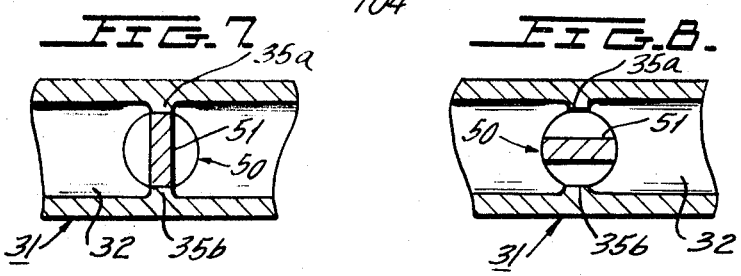

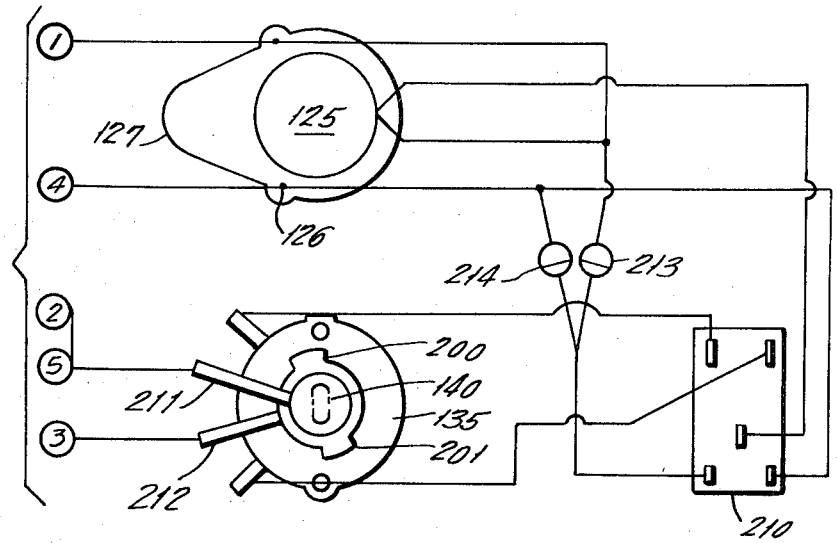
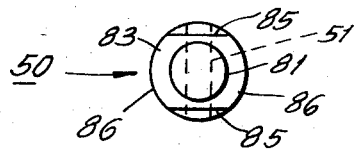
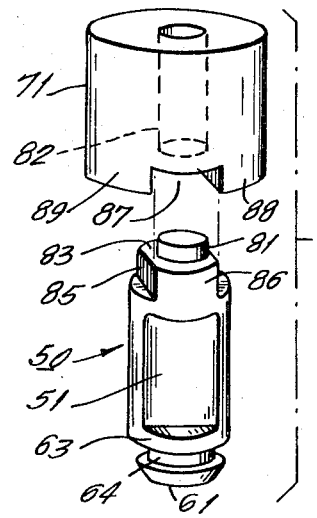
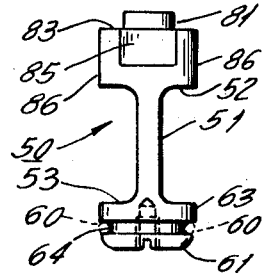
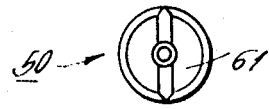

MAGNETIC VALVE

The present invention relates to a sealed valve actuated by a rotary magnetic coupling and is an improvement over the invention shown in U.S. Pat. No. 3,347,262 issued Oct. 17, 1967 to D.F. Gibson and now assigned to the assignee of the present invention.

In the manufacture of such sealed magnetically operated valves, it was previously assumed that it was necessary to use a casting for the main section of the fluid control element and that it was necessary so to integrate all of the parts including the rotary magnetic coupling, the drive for the valve and the casting so that they were substantially inseparable units not only sold as a unit but integrated as a unit; this created thermal problems requiring additional apparatus and element in order to permit the valve as a whole to be connected to the fluid circuit which it was to control. Where the structure was thus integrated and where the fluid control section was a cast member it became necessary to provide heat barriers at each end so that the unit and the operating parts and particularly the magnetic control elements would not be disturbed or deactivated by the heat necessary to make the connection into the fluid circuit.

However by making the housing for the control element and the drive member of the magnetic control device separable from the main unit, interference with the operation and function of the drive and control is prevented since these elements may be removed during an attachment operation which may involve heat. In addition, by forming the device from a forging rather than a casting, the problems with respect to blow holes and consequent leakage or rejects are eliminated. It is possible to make the forging end thinner and therefore less heat is required when soldering or using any other heat treatment method to attach the control element in the fluid circuit thereby reducing the deleterious effect of heat on any of the operating parts and thereby making it unnecessary to utilize heat barrier or other protective elements.

In addition it was thought necessary in order to obtain proper alignment and control to make the housing for the driven element of the magnetic member in such manner that it was supported by the basic casting rather than by another element secured thereto. The basic casting in prior devices was therefore designed with appropriate recesses and positioning elements or a cylinder to support the driven magnetic housing thereby complicating the structure of the casting and complicating the assembly thereof. By providing a simple cover for the driven element of the magnetic element and integrating this cover as a unit, by a simple rollover and crimping operating with the basic fluid control structure, simplified assembly and improved operation can be obtained.

Essentially the invention contemplates the utilization of a fluid control valve having a fluid control housing with a gate type valve inserted in the path of movement of the fluid, the gate being so arranged that when it is rotated with the plane of the gate parallel to the path of the fluid the fluid may flow and when the gate is rotated transverse to the path of the fluid the flow of fluid will be stopped. The gate is provided with a teflon coating which will facilitate its rotation while at the same time the nature of the coating inhibits the deposit of impurities thereon. The gate rotates in a guideway in which it may axially move to accommodate itself to variations in the driving element. The gate is positioned in and driven by the driven magnetic element of a magnetic sleeve coupling at the upper portion of the fluid controlled unit. The driven sleeve magnet is connected to the gate for rotary motion but the gate may slide axially with respect thereto. This sleeve magnet is fully protected by a cylindrical covering of hat-shaped form which covers an opening in the forging above the gate slideway and positioning section. This hat is then secured in this opening by a roll-over crimping operation hereinafter more fully described in detail which is provided with appropriate fluid seal arrangement and which integrates the hat with the remainder of the forging.

The drive apparatus consists of a sleeve magnet which may be positioned over the hat, the hat being formed of material which is sufficiently thin and non-magnetic in character so that a rotary drive may be established between the driving magnetic sleeve and the driven magnetic element which latter is connected to the gate. The driving magnetic sleeve is connected to the shaft of a motor in such manner that the connection may have sufficient tolerance to permit complete adjustment of the driving magnetic sleeve with respect to the hat which covers the driven magnetic sleeve and with respect to the driven magnetic sleeve.

A housing is provided which carries a drive motor on an intermediate platform, the shaft extending downwardly through the intermediate platform and the driving magnetic sleeve being located below the intermediate platform. (It should be noted that orientation "upper and lower" is given here for the purpose of clarity in description. The elements may actually operate in any orientation.)

A platform is secured to the forging in which is located the gate and the conduit leading to and from the gate. The platform furnishes a base for support of the housing, the housing being removable from the base. When the housing is secured to the base, the driving magnetic sleeve located in and carried by the platform in the housing may, because of the tolerance built into the connection to the motor on the upper side of the platform in the housing, adjust and align itself immediately in correct axial relationship with the driven magnet and with the protective hat or subcasing which covers the driven magnet.

A primary object of this invention therefore is the arrangement of a sealed valve of the type actuated by rotary magnetic coupling so that the housing supporting all of the driving elements may readily be separated from and reconnected to the valve body structure in the field and elsewhere.

Another object of the present invention is the arrangement of the drive element for said valve so that the heat necessary in securing the valve body in a fluid circuit will not have any deleterious effect on the valve operating elements thereby eliminating the need for any protective heat barriers which had previously been thought necessary.

Another object of the present invention is the formation of the housing or enclosure for the driven element of the magnetic coupling so that it is a separate cylindrical enclosure which may readily be secured to the valve structure rather than a member which is integral with the valve housing.

Another object of the present invention is the provision of a valve gate which is Teflon coated and which is arranged so that it may readily be compliant particularly in an axial direction with respect to the drive element while nevertheless performing the function of opening the fluid circuit or closing the fluid circuit.

The foregoing and many other objects of the present invention will become apparent in the following description and drawings in which:

FIG. 3 is a view, corresponding to that of FIG. 1, in vertical cross-section showing the housing and the drive elements themselves in position for the completely operative valve structure.

FIG. 4 is an end view of driven valve body without the housing taken from the end 4 of FIG. 1.

FIG. 5 is a top view partly in section of the valve structure taken from line 5—5 of FIG. 3.

FIG. 6 is an enlarged view of the seal for the enclosure of the driven magnet of FIG. 3 showing the details thereof.

FIG. 7 is a cross-sectional view taken on line 7—7 of FIG. 3, showing the valve in closed position.

FIG. 8 is a view corresponding to that of FIG. 7 showing the valve in open position.

FIG. 9 is a view taken from line 9—9 of FIG. 3 looking in the direction of the arrows and showing the driving connection between the motor shaft and the outer sleeve or driving magnet.

FIG. 10 is a top plan view of the gate valve of FIGS. 1, 3 and 5.

FIG. 11 is an elevation of the gate valve.

FIG. 12 is a bottom view of the gate valve.

FIG. 13 is an expanded view in perspective showing the method of driving connection between the inner driven magnet and the gate valve.

FIG. 14 is a schematic of the circuit for actuating the driving motor in order to operate the valve arrangement.

Figure 1:
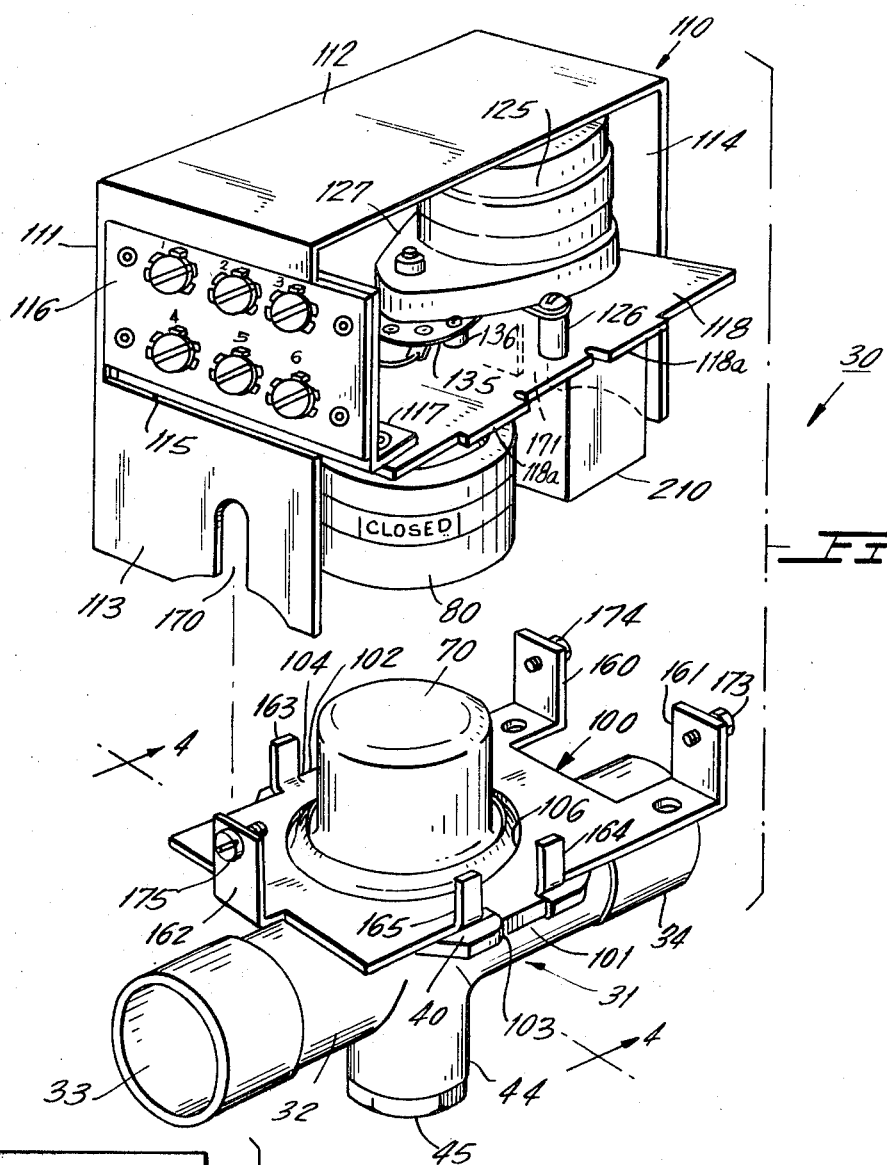
FIG. 1 is an expanded view in perspective showing the novel fluid valve magnetic coupling operating device of the present invention with the housing containing the drive element and the drive magnet shown partly removed from the valve structure.
Figure 2:
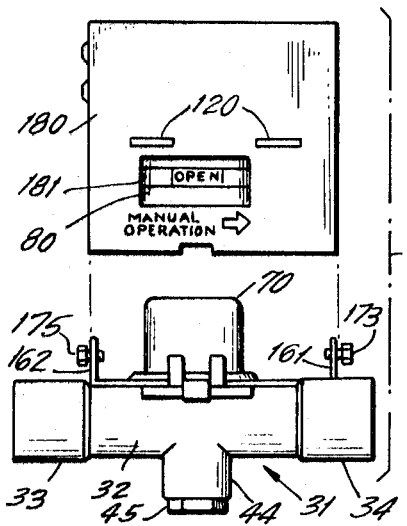
FIG. 2 is a side elevation of the structure as shown in FIG. 1 showing a cover element placed on the housing for the operating elements in order to complete the same.

Referring now to the drawings, the valve unit 30, FIGS. 1, 2 and 3 comprises a forging 31 which is essentially a cylindrical body 32 having a pair of oppositely disposed ports 33 and 34; a central cylindrical valve seat 35 which is seen more clearly in FIGS. 4 and 5 includes the shoulders 35a, 35b which project vertically inwardly from the internal sides of the tubular or cylindrical member 32. Preferably this valve seat 35 is located substantially equidistant from the ports 33 and 34. connected of the ports 33 continuous may constitute the influent or effluent section of the valve structure, the orientation and construction being such that the direction of flow of platform fluid does not affect the method of operation of the valve.

The utilization of a forging rather than a casting provides a number of advantages among which are: It is more economical to make and provides a better looking pipe. The alloy used in the forging makes it easier to crimp than would be the case with a casting; hence the method of securing the protective casing and seal for the inner or driven magnet which is connected to the valve gate as hereinafter described becomes simpler, more economical and more secure. In the forging there are no leaks because there are no blow holes; therefore it is more reliable and there are fewer rejects. It is possible to make the forging end thinner as shown adjacent the effluent or influent openings 33, 34 and therefore less heat is required when soldering. As a result there is less likelihood of damage to the various parts and special protective means or barriers to protect the operating elements from the effect of the heat generated while making the solder connection into the fluid circuit are obviated.

The portion of the forging adjacent the upper part of the valve seat is thickened to provide the horizontal platform 40 which is integral with the forging forming the pipe 32 but extends tangentially thereof being connection thereto by the integral c ntinuous rib 41 on each side. The extensions 42 on each side of the platform 40 provide a means for supporting an additional auxiliary plateform hereinafter described which will support the housing for the operating elements also hereinafter described. The thickening of the forging at the platform 40 provides increased structural strength for the valve seat 35 which continues at 35c as a central opening in the platform 40 and also provides a structure which is sufficiently strong to provide an efficient support for the housing and the driving elements hereinafter described as well as the auxiliary platform on which they rest.

The forging 31 forming the pipe 32 is also provided with the integral downward pipe-like extension 44 which forms the bottom portion 35d of the valve seat which is provided with a plug 45 which may be threaded in as shown and appropriately gasketed as shown at the gasket location 46 to provide an efficient seal for the lower portion of the valve seat.

The gate valve 50 comprises a vertically longitudinal structure preferably metallic which is coated with Teflon in order to lubricate it in operation and to provide a surface to which impurities may not readily adhere. The gate valve 50 comprises the gate section 51 which is essentially a flat vertical element which may be rotated from the position shown in FIG. 7 to the position shown in FIG. 8 and back again (or forward another 90°) in the valve seat elements 35, 35 in order to open and close the passage through pipe 32. The gate valve 51 is provided with upper and lower cylindrical bearing sections 52, 53. The upper section 52 rotates in the circular opening 35c in the platform 40 and the lower cylindrical section 53 rotates in the pipe extension 44 extending downwardly from the pipe 32 aligned with and opposite to the opening 35c in platform 40.

It should here be pointed out again that the terms upper and lower are used with respect to the drawings in order to provide a reference point; this terminology however should not be interpreted to require that the valve structure be used in the positions shown since the structure is capable of being used in any orientation. For reasons hereinafter described the gate valve 50 should have some vertical compliance in the valve seat 35 and valve seat elements 35c, 35d. Accordingly it becomes desirable to provide an appropriate sliding gasket particularly at the bottom part 44 which is at right angles to the pipe 32. For this reason the gate valve structure 50 is constructed as shown in FIGS. 10, 11 and 12 in which it may be seen that an O-ring 60 may be captured in the gate valve 50 at its lower end in a groove 64 at the lower cylindrical end 63 of the gate valve 50. The said lower cylindrical element end 63 thus has an annular recess 64 formed therein defined by the end 61 extending beyond the recess to form a channel between the elements 64 and 63 for mounting the O-ring or other appropriate gasketing element 60 therein. The pipe 44 which forms the lower portion of the valve seat is provided with an inner annular groove (FIG. 3) 66 which will receive the O-ring 60 and will provide an appropriate watertight seal between the gate valve 50 at the O-ring 60 and the groove 66 when the plug 45 is removed. The annular groove 66 is vertically wider than the 0-ring 60 so that the gate valve 50 may move vertically in the valve seat to align with the operating elements.

The upper cylindrical section 52 of the gate valve may similarly move vertically in the opening in the upper platform 40. This passage however need not be gasketed since an appropriate watertight seal for this purpose is provided by the cover 70 around the upper driven magnet 71 which is connected to the gate valve in the manner hereinafter described.

The cover 70 for the internal or driven magnet 71 is formed of a material which does not impede the operation of the magnetic forces and is sufficiently thin to permit cooperation between the driving and driven magnet to occur with the driven magnet inside the cover 70 and the driving magnet outside the cover 70. An annular groove 73 is formed in the upper surface of platform 40 surrounding the opening 35c in the platform 40 which serves as a valve seat. The material upset from this annular groove 73 provides crimping section 74 which is also annular. The cover element 70 for the magnet 71 has a cylindrical section 75 which is integral with the top section 76 and is provided with a lower annular extension having the flat horizontal flange 77 as shown in detail in FIG. 6. The flat horizontal flange 77 is placed on O-ring 78 in the groove 73 and the circular crimping element 74 is rolled over onto the extension 77 of the cover 70 compressing the O-ring 78 between the flange 77 and the base of groove 73 thereby providing an efficient seal at and surrounding the magnet 71 and the valve member 50. Therefore the gasket 46 at the lower end of the pipe 44 and the gasket 73 sealing the flange 77 of the cover member 70 provide a complete seal for the valve structure preventing leakage from the interior of the pipe 31.

In prior structures the flange 77 of the cylindrical section 75 was actually welded to platform 40. This was unreliable however due to possible damage both to the cover and to the magnet which was required to withstand the welding heat as well as the welding stresses. In the present construction the O-ring provides an efficient seal between the complete enclosing structure 70 and the pipe.

This O-ring construction entails much less labor and is far more reliable than prior devices. Also the unit is far less complicated in design and construction. The upper crimping flange 74 it should be noted is rolled on rather than being bent over. This construction provides an arrangement which is stronger than the 90° angle that would occur in a bend and which might break under tensile stresses whereas the rolled form would not break in any bending stress. The material of O-rings 60, 46 and 73 is such that it has a high resistance to temperature and therefore is not affected by the heat of soldering and there is no need to shield or protect the O-ring.

What is far more important, however, is that by the utilization of the hat construction 70 there is no need to weld any cover adjacent the inner magnet 71 and therefore the magnet is not subject to the deleterious effect of heat. The deleterious effect of heat is also avoided by forming the ends adjacent the openings 33 and 34 so that they are thinned down and therefore more easily soldered to the connecting pipes on either side thereby not only reducing the effect of heat but also obviating the need for barriers between the source of heat and the remainder of the unit. In addition the outer or driving magnet 80 as hereinafter described and the entire housing containing the motor and carrying the magnet may readily be removed during any connecting operation thereby separating the motor and the upper magnet completely from any source of heat during the connecting operation and thereby making the unit as a whole in assembly and in operation far more reliable.

The placement of the O-ring 60 on the gate valve 50 rather than in the internal bore of the pipe 44 provides a means for absolutely assuring the positioning of the O-ring 60 by the appropriate tightening of the plug 45. This is an improvement over the utilization of an internal groove in the bore of pipe 44 wherein the O-ring is hopefully positioned inside the groove and hopefully retains its position with respect to any sliding forces.

The inner magnet 71 serves as the drive for the gate valve 50. However, the gate valve 50 should have some compliance with respect to the inner magnet 71. In order to provide for such compliance, the magnet 71 and the gate valve 50 are substantially centered with respect to each other by the cylindrical projection 81 from the top of the gate valve entering into the opening 82 at the bottom of the magnet thereby providing positioning with respect to the magnet 71 and the gate valve 50. The upper surface 83 of the gate valve 50 adjacent the cylindrical projection 81 need not necessarily come in contact with the lower surface of the magnet 71 at the opening 82 as long as the cylindrical portion 81 extends into the opening 82 to provide for relative positioning. By this means therefore and because of the dimensioning of the surface 83 with respect to the length of the gate valve 50 between the surface 83 and the bottom 61 there is sufficient room vertically for the gate valve to adjust itself automatically vertically. A drive between the inner magnet 71 and the gate valve 50 is established by the flat portions 85, 85 of the main cylindrical extension 86 of the gate valve 50. These flat portions 85, 85 fit in the slot 87 formed between the elements 88 and 89 of the magnet 71 so that a driving connection between the magnet 71 and the gate valve 50 is established. Since the proper open position of the gate valve 50 is shown in FIG. 8 and the proper closed position is shown in FIG. 7 and since the driven magnet 71 will be moved to either of these two positions by the driving magnet as hereinafter described and since these two positions must be established, the rotational drive between the magnet 71 and the gate valve 50 is therefore required to be accurate and for this reason there is a close fit between the flat side 85, 85 of the extension 86 of the gate valve 50 and the slot 87 of the driven magnet 71.

As shown particularly in FIG. 1 as well as in FIGS. 3, 4 and 5 a housing supporting platform 100 is mounted on the forging platform 40 in any suitable manner. In the particular embodiment shown, the housing supporting platform 100 is provided with a pair of extensions 101, 102 front and back which may be crimped through and under a slot 103, 104 in the front and back of the platform 40. The housing supporting platform 100 is provided with a circular opening 106 which passes over the enclosure or hat 70 for the internal driven magnet 71. The housing 110 has a rear wall 111 from which is bent or otherwise formed a top wall 112 and side walls 113 and 114. The side wall 113 is cut out at the rectangular section 115 to provide a recess in which is supported an insulating terminal strip or block 116 which is supported in any appropriate manner as by the L-shaped bracket 117 carried on the horizontal wall 118 of phenolyic or other insulating material 118. The wall 118 is supported in the housing by protrusions 118A extending from wall 118 and snapped into slots 120 which are in the rear wall 111 and front wall 180 of housing 110. A driving motor 125 is contained within the housing 110 supported by the legs 126 on the insulating wall 118 and provided with a gear train in housing 127 terminating in the drive shaft 128 which extends through the center of the switch wafer 135. The switch wafer 135 is separately supported by appropriate support legs 136 on the insulating platform 118. The drive shaft 128 terminates in a drive section 140 of generally rectangular cross-section passing through the circular opening 141 of the horizontal carrier 142 of the driving magnet 80. The horizontal carrier 142 secured to the driving magnet 80 is carried on the rectangular extension 140 with flange 145 of the drive shaft 128 by press fit which secures it thereto and prevents it from falling off.

Projecting points 150 from the opening 141 (FIG. 9) of the horizontal carrier 142 of the external magnet 80 is so arranged as the square section 140 of the drive shaft engages these points 150 it will rotate the external magnet 80. It will be noted that with respect to FIGS. 7 and 8 that the angular distance between the closed and open position of the gate valve 50 is 90° and this construction as shown in FIG. 9 provides a lost motion connection between the driving motor 125 in housing 110 and the driving magnet 80 so that if gate 50 or magnet 71 is stuck the carrier 142 will rotate freely, due to magnetic reaction, in the same direction away from its driven position shown in FIG. 9 to a position approximately 90° counterclockwise from FIG. 9. The motor will continue to rotate the square section 140 counterclockwise and then reengage carrier 142 to continue to drive it in a counterclockwise direction. This eliminates a shock moment force on the motion shaft and this prevents damage to the gear train or clutch of the motor. Thus on rotation of the motor and the squared section 140 of the shaft in the counterclockwise direction, the square shaft 140 will rotate and pick up the projections 150 to rotate the magnet and effect the opening or closing of the valve. If the valve or magnet is not stuck, a rotation of the order of 90° of the motor shaft 140 will in each case result in a 90° rotation of the driving magnet 80 and therefore a 90° rotation of the gate valve 50.

It should also be noted that if the motor rotates in a single direction, then each 90° rotation of the shaft 140 will result in changing the position of gate valve 50 from open to closed or closed to open position. In previous devices, chrome plated brass was used for the gate and this had a possibility of binding. In the present unit the gate is coated with teflon. This prevents sticking between the gate and the base body and therefore serves as a lubricant. Also the teflon prevents foreign particles in the fluid from building up on the gate 50 and within the valve. There is also less friction of the fluid going through the valve owing to a smoother surface of the gate valve.

The housing supporting platform 100 is provided with upstanding supports 160, 161, 162 and upstanding positioning elements 163, 164 and 165 for the housing 110. The side walls 114 and 113 of the housing 110 are slotted at 170, 171 as shown with the slots extending to the bottom of the said side walls. These slots may pass between the heads of screws 173, 174, 175 and their respective support elements 161, 160 and 162. After the housing is placed on the platform positioning elements 164, 165, 163 the screws may be tightened and hold the housing in position. When it is desired to remove the housing as shown in FIG. 1, these screws 173, 174, 175 may be loosened and the housing lifted off.

Thus when it is necessary to connect the valve body in a fluid circuit and apply heat to the ends 33, 34 of pipe 32 the screws 173, 174, 175 may be loosened and the housing lifted off so that the main driving magnet 80 and the motor are not subjected to any heat at all. Also, again, since the ends 33, 34 may be thinned down, the amount of soldering necessary both with respect to the amount of heat and the length of time to which the unit is subjected to heat are greatly reduced so that the internal driven magnet 71 is not deleteriously effected. Also by reason of the fact that the entire valve seat 35 and the valve gate 50 is centrally located thereby centrally locating the internal driven magnet 71 as well as centrally locating the driving elements the structure is such that the elements are equidistant from the ends 33, 34 of the pipe and no special heat barriers are required on any particular side.

To complete the structure the housing 110 may be provided with a front wall 180 secured thereto in any suitable manner and as indicated in FIG. 2. This front wall 180 may be provided with an opening 181, the side of the driving magnet 80 may be provided with appropriate indicia showing the open and closed position of the valve, said indicia being visible through the opening 181.

As previously pointed out this invention may be regarded as an improvement of the device shown in U.S. Pat. No. 3,347,262 and the magnetic operation of the unit is as therein described. However, the unit as shown in the aforesaid U.S. Pat. No. 3,347,262 is arranged so that when installed and when in use the entire unit is completely integrated. In the present device as already described, the housing 110 including the drive magnet 80, the motor in subhousing 125 and the electrical element may be removed when the device is installed. When completion of installation of the unit occurs, then the housing 110 may be located on the housing support platform 100 as previously described. The interior of magnet 80 now receives and rides on the outside of the enclosure 70 for the inner magnet 71. Owing to the construction and expected operation of the magnet, the inner magnet 71 connected to the gate valve 50 will immediately orient itself with respect to the outer or driving magnet 80 matching the indicia on the driving magnet for either the closed or open position of the gate depending on the bent position of the driving magnet. Consequently the indicia "closed" or "open" visible through the window 181 of the front 180 of the housing 110 will indicate the condition of the valve gate whether open or closed. The valve may also be manually operated by rotating the driving magnet by finger pressure through slot 181 in a direction consistent with the gear train.

FIG. 14 shows a circuit which may typically be used for operation of the motor under the control of the switch 135. Essentially the switch 135 is arranged to halt the operation of the motor at the appropriate angular position of the motor the drive shaft and the driving magnet 80, that is when the driving magnet 80 is in one position and squared end 140 of the motor shaft is in a similar position, the motor may be started in order to operate the motor in a direction to move the gate valve 90° to the other position of the gate valve. When the 90° rotation is reached the cam 200 or 201 will open the circuit to the motor and stop it. This halt will then be at either a closed or open position of the gate valve. Thereafter when the motor is energized once more, it will operate in the same direction to move the gate valve through another 90 degrees at which time the circuit will again be opened by one of the cams 200, 201.

The particular circuit and relay which achieves this result, although known, is not an essential part of the present invention as long as cam 200 or 201 is used to halt the motor when the next (open or closed) position of the valve is reached. It is possible also to halt the operation of the motor at an intermediate position to leave the gate valve partly open and thus to control the quantity or rate of flow through the valve.

The particular parameters of the circuit are not essential to a full understanding of the present invention since it is obvious that the motor here can rotate unidirectionally with the motor being started by closing an appropriate switch or operating the relay 210 to start the motor in a circuit which includes the diodes 213 and 214. The circuit to the motor is then opened when cam 200 passes elements 211, 212 of the switch 135. Thereafter when it is desired to move the gate 90° once more, to an alternate (closed or open) position then the motor may be started once more bypassing elements 211, 212 of the switch. On completion of 90° rotation of motor shaft 140 cam element 201 will move to open the switch 211, 212 and halt the motor. When it is desired now to go to the next operative position of the valve, the motor is started again and operating in the same direction the cam element 200 will operate to halt the motor. Thus the motor may operate unidirectionally. No reversal is needed since the valve gate for every 90° rotational will move to either the next open or closed position of the valve system.

In the foregoing the invention has been described in connection with an embodiment which is primarily illustrative and represents a form which has been found to be appropriate and useful. One of the essential elements is the removability and hence replaceability of the housing for the motor and the driving magnet. The driving magnet which is mounted on the motor shaft, the motor which is mounted on the insulating support within the housing, the switch which is mounted on the said insulating support, the terminal block and circuit connectors which are mounted on an inset in the side of the housing all provide a structure within the housing which is removable and separable from the valve body and which may nevertheless readily be connected thereto and disconnected therefrom. The flexible connection of the driving magnet to the motor shaft in such manner that it may rock and adjust itself both axially and also laterally in order to comply with the dimensional arrangement of the cover 70 for the internal driven magnet 71 provides for a simplified interconnection and separation. On loosening the three screws 173, 174, 175, the housing may be removed. When the housing is replaced the driving and driven magnet automatically align themselves and the screws 173, 174, 175 are tightened and the entire unit is integrated and ready for operation. The utilization of the insulating base for supporting the driving magnet, the motor, the switch element and the circuit connections provides for protection and insulation of the motor and circuit connections from the possibly deleterious effect of any hot water passing through the pipe valve. The structure lends itself to the mounting of the terminal board as shown and the various connections higher and further removed from the valve and its solder points. Again it must be emphasized that the valve may be soldered in position with the housing containing all of the electrical magnets and the driving magnet removed so that a deleterious effect from the heat of solder will not be transmitted thereto. The utilization of the forging rather than the casting eliminates not only the possible blow holes but also makes it possible to provide a unit which is more readily worked in which the ends of the pipe opening may be made thinner and thus make it possible to utilize less heat for a shorter period of time to effect an interconnection in the fluid circuit. The utilization of the hat like cover 70 for the inner magnet 71 provides not only economies of manufacture but eliminates the need for welding any cover in place and thereby eliminates any possible deleterious effect on the inner or driven magnet, while nevertheless providing a simplified seal which is stronger than prior seals. The utilization and location of O-rings which can resist the heat of soldering as well as the heat which may occur from the hot water passing through and the location of the O-rings between the hat and the integral platform 40 as well as the location of the O-ring in the gate valve itself rather than in the bore of the gate valve provide for simplified operation and assurance of accurate operation. The utilization of Teflon coating for the gate valve provides the beneficial effects previously described. The utilization of a symmetrical construction ensures that the appropriate calculations may readily be made with respect to the heat of soldering as well as the time of soldering in order to ensure that the operation of connecting the valve structure into the pipe will proceed smoothly and without deleterious effect on the remainder of the structure. All of these elements taken together and in combination provide for an improved valve construction which will not only facilitate installation and replacement and repair but will also be long lived.

Since the foregoing invention has been described in connection with an illustrative embodiment which however illustrates and demonstrates the various principles involved, it is preferred that the scope of this invention be defined not by the specific embodiments herein contained but only by the appended claims.

The embodiments of the invention in which an exclusive privilege or property is claimed are defined as follows:

1. In a valve structure having a substantially longitudinal cylindrical base, said base having a longitudinal bore terminating in influent and effluent ports connectable in a fluid circuit,
a valve seat normal to said bore and situated between said ports,
a rotatable valve in said valve seat,
a driven magnet,
said rotatable valve being connected to said drive magnet,
said cylindrical base having a tangential platform, an opening in said platform communicating with said bore and valve seat,
a cylindrical hat-like structure of non-magnetic material secured at said opening and containing said driven magnet,
said cylindrical hat-like structure being sealed to said platform,
and a housing supported on said platform,
a driving motor carried in said housing,
a cylindrical driving magnet in said housing compliantly connected to and driven by said motor,
said driving magnet surrounding said cylindrical hat-like structure and establishing a driving magnetic connection to said driven magnet,
the housing being provided with an additional platform of insulating material extending substantially parallel to the first mentioned platform,
said motor being mounted on said claim platform on the side thereof remote from the first mentioned platform.

2. The valve structure of claim 1 having a gear train connected to the motor, and a shaft connected to the gear train and controls for the motor,
said gear train and controls being mounted on the same side of the additional platform as the motor, and
a shaft extending from the gear train through the additional platform,
the driving magnet being compliantly connected to said shaft below said additional platform.

3. The valve structure of claim 2 wherein said housing is removable and replaceable on said first mentioned platform; the said housing together with the motor, gear train, controls, shaft and driving magnet being removable from the longitudinal cylindrical base to permit heat generating operations to be performed on the valve structure with the said housing and elements contained thereby removed.

4. In a valve structure having a substantially longitudinal cylindrical base, said base having a longitudinal bore terminating in influent and effluent ports connectable in a fluid circuit,
a valve seat normal to said bore and situated between said ports,
a rotatable valve in said valve seat,
a driven magnet,
said rotatable valve being connected to said driven magnet,
said cylindrical base having a tangential platform, an opening in said platform communicating with said bore and valve seat,
a cylindrical hat-like structure of non-magnetic material secured at said opening and containing said driven magnet,
said cylindrical hat-like structure being sealed to said platform,
and a housing supported on said platform,
a driving motor carried in said housing,
a cylindrical driving magnet in said housing compliantly connected to and driven by said motor,
said driving magnet surrounding said cylindrical hat-like structure and establishing a driving magnetic connection to said driven magnet,
the rotatable valve being a Teflon coated gate valve having an annular O-ring carried thereby at the section opposite the end connected to the driven magnet,
and an annular recess in the valve seat wider than the O-ring, the O-ring engaging the base of said recess, the width of said recess permitting said gate valve to move axially with respect to said valve seat.

5. In a valve structure having a substantially longitudinal cylindrical base, said base having a longitudinal bore terminating in influent and effluent ports connectable in a fluid circuit,
a valve seat normal to said bore and situated between said ports,
a rotatable valve in said valve seat,
a driven magnet,
said rotatable valve being connected to said driven magnet,
said cylindrical base having a tangential platform, an opening in said platform communicating with said bore and valve seat,
a cylindrical hat-like structure of non-magnetic material secured at said opening and containing said driven magnet,
said cylindrical hat-like structure being sealed to said platform,
and a housing supported on said platform,
a driving motor carried in said housing,
a cylindrical driving magnet in said housing compliantly connected to and driven by said motor,
said driving magnet surrounding said cylindrical hat-like structure and establishing a driving magnetic connection to said driven magnet,
the compliant connection between the motor and the driving magnet comprising a shaft driven by the motor;
a carrier for the driving magnet, and an opening in said carrier, the shaft extending through said opening,
the opening being circular and the shaft having a rectangular cross-section; means supporting the carrier on the end of said shaft and permitting the carrier and driving magnet to rock on said shaft,
the driving magnet being fixed with respect to said carrier,
and a driving connection between the shaft and carrier comprising projections in the opening in the carrier extending in the path of rotational movement of an edge of said rectangular shaft.

6. The valve structure of claim 5 in which said projections on said carrier are located 180° from each other to permit lost motion of said driving magnet due to magnetic reaction in the same direction ahead of said shaft so that thereafter said shaft driven by said motor will catch up to and continue to drive said driving magnet in the same direction.

* * * * *